Patented June 5, 1945

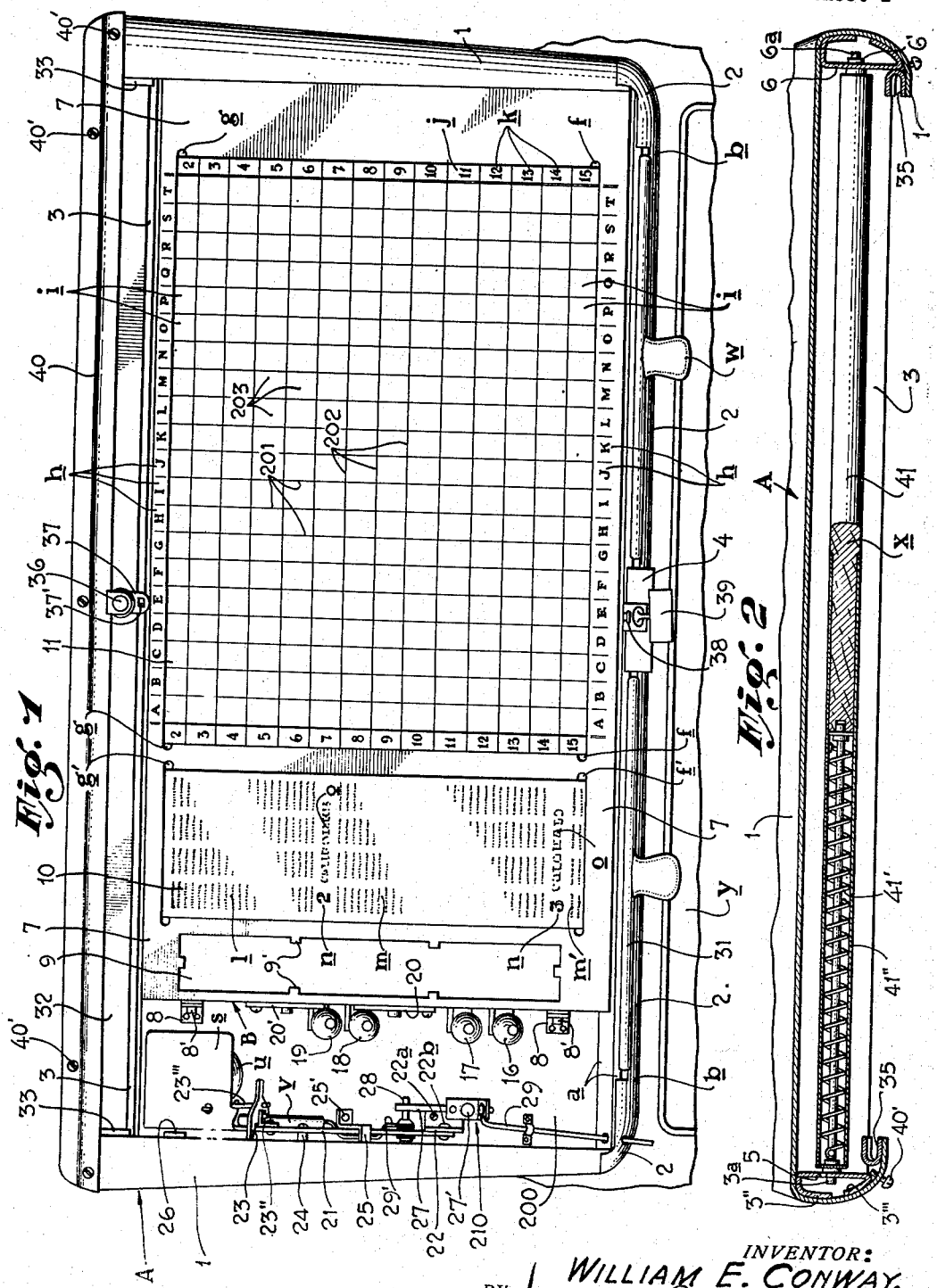

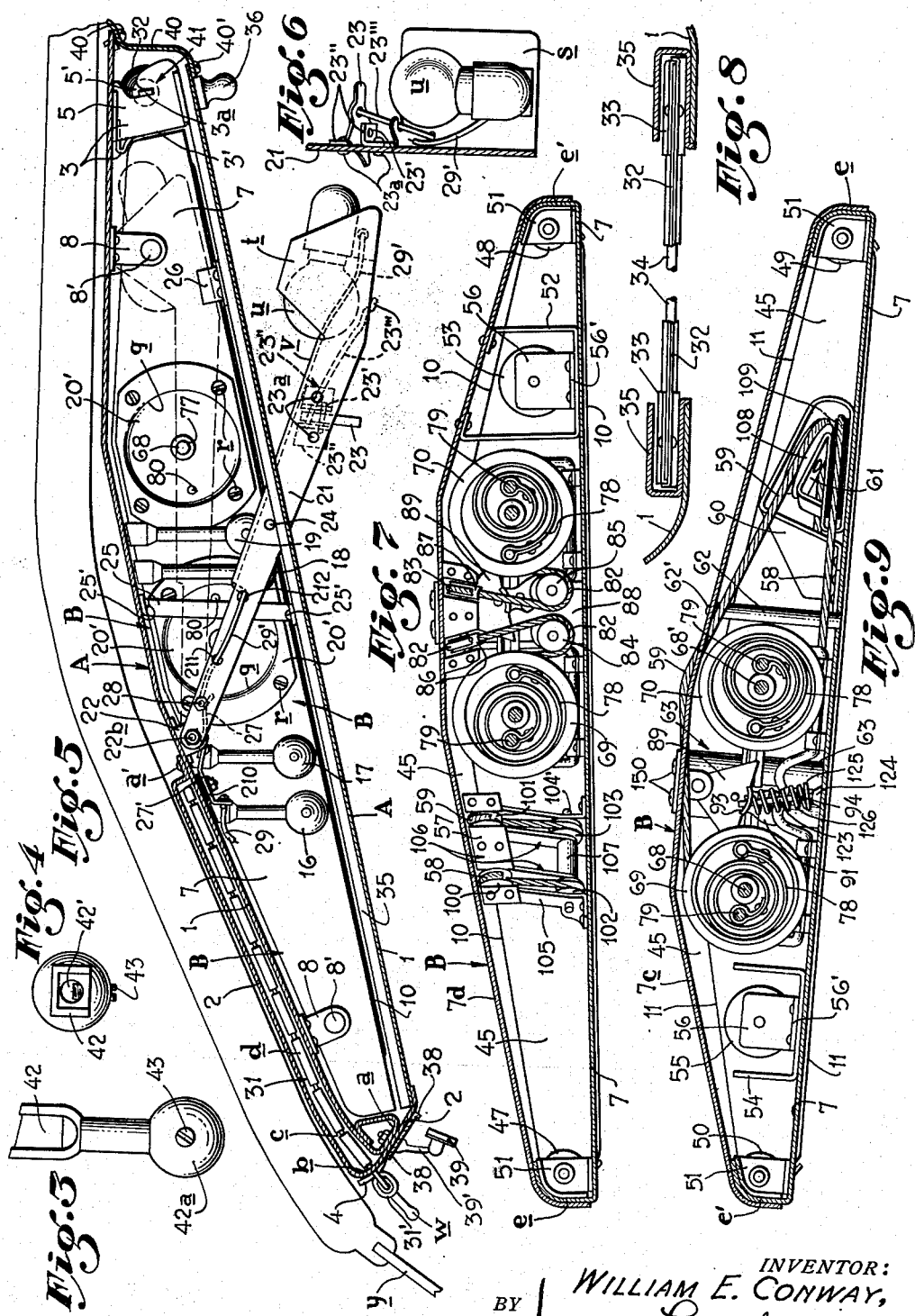

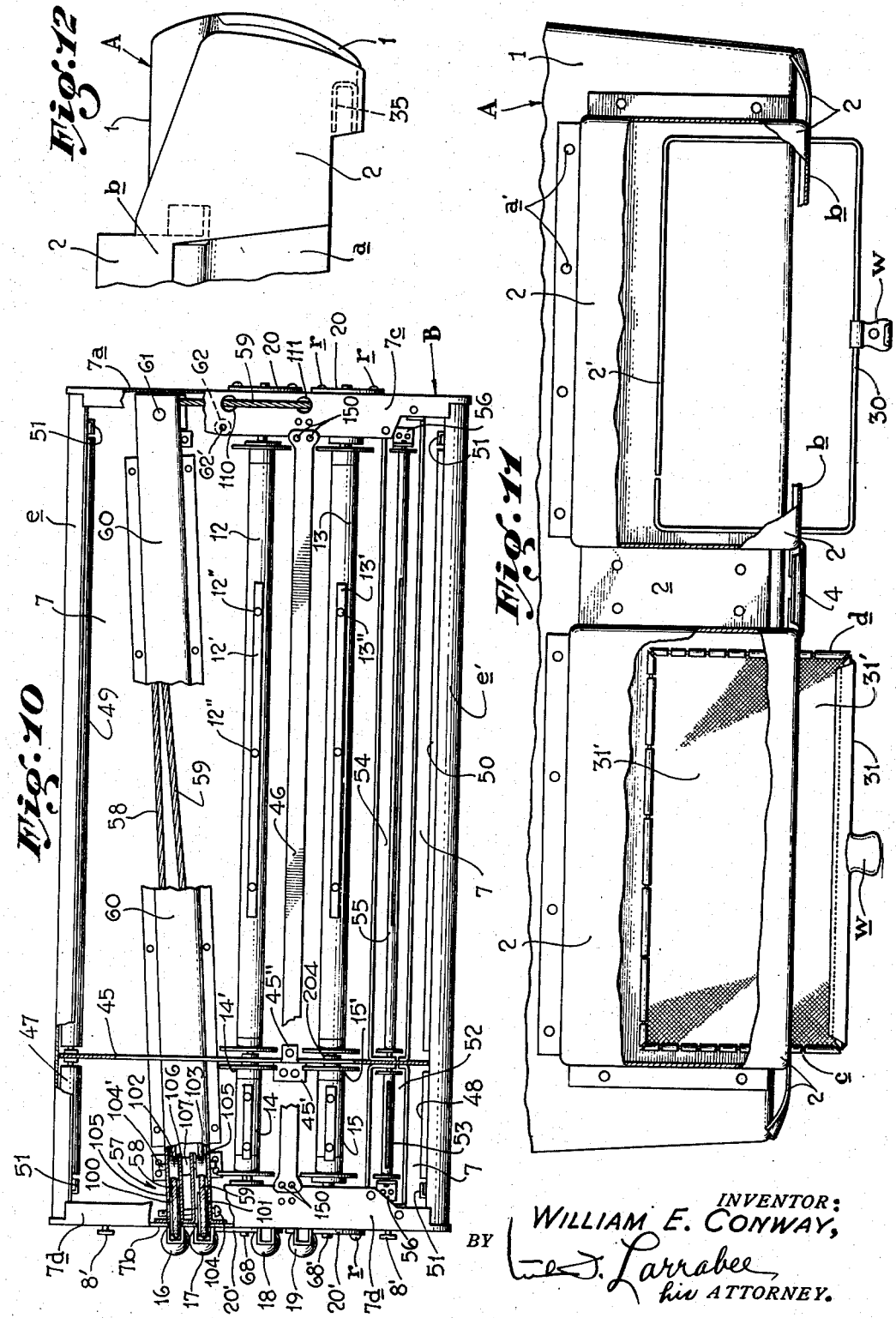

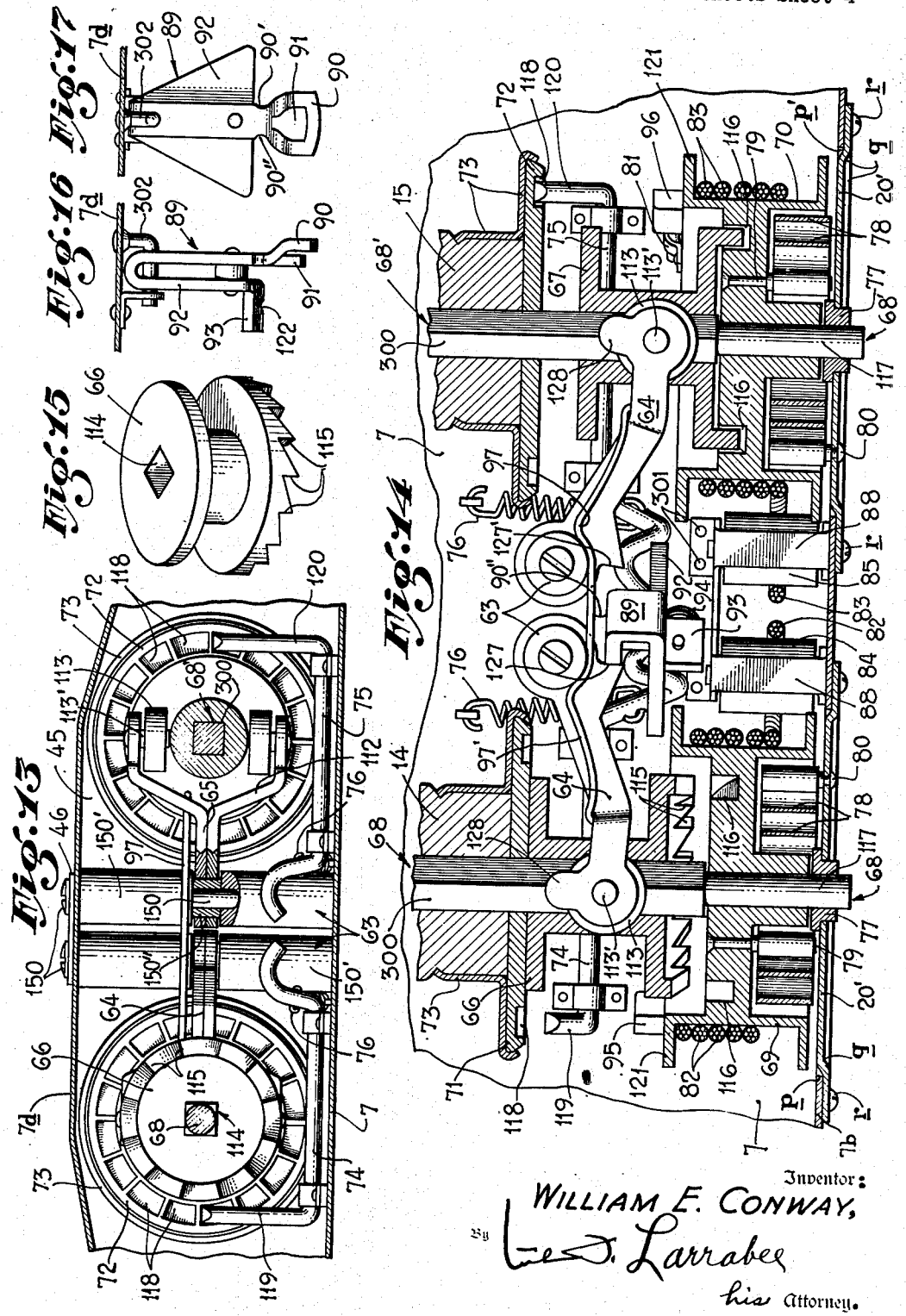

2,377,614

UNITED STATES PATENT OFFICE 2,377,614

COMBINED ROAD MAP REEL AND SUN VISOR

William E. Conway, Los Angeles, Calif.

Application November 1, 1940, Serial No. 363,853

8 Claims. (Cl. 40—87)

My invention relates to a combined road map reel and sun visor which is particularly adapted to be constructed as a unit and attached to the interior forward portion of the top of an automobile or to be "built-in" the automobile in initial manufacture.

My invention is particularly adapted for use by persons driving automobiles, trucks, and motorized military vehicles, and has for an object the provision of novel means whereby the driver may easily follow the road map and the road upon which he is driving in any particular locality that he may be traversing.

An object of my invention is to provide novel means by which a series of road maps and indexes relating thereto may be made readily and easily accessible to the view of an automobile driver without detracting from the appearance of the interior of the automobile, and without requiring the attention of the operator to be materially detracted from the traffic conditions on the highway over which he may be driving, when it is desired to view the exposed portion of the map.

Another object is to provide a novel device which provides for easy and quick manipulation of the road map to move the same within the housing from time to time so as to expose various portions thereon to correspond with the place on the highway where the automobile is, as well as a considerable portion of the highway to be travelled and so that after such portion of the highway exposed on the map is traversed, a subsequent portion of the map may be easily and quickly exposed to disclose a further expanse on the highway being traversed.

Another object of my invention is to produce a novel device having the above characteristics and which may be easily secured to, or combined with, the forward interior roof portion of automobile top and in front of the driver's seat and in such a position where it may be easily and quickly viewed by the driver and yet not interfere with his vision of traffic conditions on the highway.

A further object is to provide novel means for illuminating the exposed portion of the map when necessary so that the map may be used at all times, regardless of light conditions.

A still further object of my invention is to provide a novel road map reel in which road maps and indexes therefor may be wound upon their respective reels and a portion thereof exposed to view, and when it is desired to change the maps and/or indexes, the mounting means therefor may be easily and quickly removed from, and attached to, a holder means therefor that may be secured to, or built in, the forward interior portion of the automobile top.

A still further object is to combine novel sun visors with a road map reeling device, and in which the operation or use of the sun visors will not be affected by the location or operation of the road map and indexes therefor.

A still further object of my invention is to provide a novel road map and index therefor, whereby the desired location on the map, for example, of city streets or rural points, may be easily and quickly found on any one of a series of maps used in my device.

Other objects, advantages, and features of the invention may appear from the accompanying drawings, the subjoined detail description and the appended claims.

The accompanying drawings, illustrate the invention in a form I have at present deemed preferable.

Figure 1 is a view of my novel device as viewed from the driver's seat of an automobile (a fragment of which is shown) and with the same uncovered.

Figure 2 is an axial sectional view taken adjacent to the rear of the holder with the blind cover-plate removed, showing a spring operated roller upon which a fabric blind is rolled, and which may be drawn over the face of the device when not in use.

Fig. 3 is a side elevational view of one of the operating pendants attached to the map and index operating mechanism.

Fig. 4 is a plan view of the pendant shown in Fig. 3.

Fig. 5 is a view looking from the left toward the right with portions of the holder and sun visor housings cut away to show parts otherwise hidden, and with the lamp arm adjusted for use so that light may be thrown on the map at night.

Fig. 6 is a plan view of the free end of the lamp arm and lamp associated therewith.

Fig. 7 is an elevational view (looking from the left to the right) of the reel, and with the end of reel case cut away to expose parts of the operating mechanism and index strip.

Fig. 8 is a rear elevational view of the front end of the blind and associated races that are mounted on the holder case. Parts are broken away to contract the view.

Fig. 9 is an elevational view (looking from the right to the left) of the reel, and with the end of the reel case cut away to expose parts of the operating mechanism and the map strip.

Fig. 10 is a plan view of the reel as viewed from the rear looking toward the front and showing the method of bringing the cable for operating the right end mechanism to the left end of the reel and associated parts.

Fig. 11 is a fragmentary plan view of the front portion of the holder as viewed from the front, showing the sun visor housings mounted thereon, and with portions broken away to illustrate parts otherwise hidden. In the interior of the right hand visor housing is shown the wire spring frame and attached metal thumb tab over which the visor fabric is sewed; within the left hand visor housing is shown a completed visor showing three edges thereof protected by metal clips, and the front edge and tab being upholstered with cloth.

Fig. 12 is a fragmentary elevational view on an enlarged scale of the left front corner of the holder and visor housing.

Fig. 13 is a fragmentary side elevational view on enlarged scale of one end of the reel with the reel case cut away and parts of the mechanism removed, disclosing the ends of the map or index spools.

Fig. 14 is a fragmentary plan view on enlarged scale of the operating mechanism at the left end of the device with only the lower half of the parts encircling the spool shafts being shown.

Fig. 15 is a perspective view of one of the sliding ratchet clutch collars.

Fig. 16 is a side elevational view of the left end central shifting lever, as viewed from the rear of the reel.

Fig. 17 is an elevational view of the shifting lever shown in Fig. 16, viewed from the middle section of the reel.

My novel combined road map reel and sun visor is made in two detachable parts which includes an outer housing A, hereinafter referred to as a housing or holder, and which is secured by any suitable means to the ceiling or interior of the automobile top just above and behind the windshield thereof; and also includes a map-reeling device B, hereinafter referred to as the reel or reel case and which may be easily and quickly secured to the holder or detached therefrom if it is desired to exchange the maps and indexes for others.

The holder case A (Figs. 5 and 11), is preferably constructed of three pieces of sheet metal that includes the main section 1 comprising the top, ends and front wall; a visor housing 2 secured to the top of the main section 1 and which serves to reinforce the front corners of the holder A; and a rear cross member 3, which provides a wall that separates the reel from the blind roller mounted therein.

The ends of the main section 1 are turned down and under to form the end walls of the holder as indicated in the rear elevational views shown in Figs. 2 and 8, and by the heavily shaded ends in Fig. 11; and such turned under portions serve as a foundation or base upon which the blind races 35 are mounted. The front edge of the main section 1 is bent down and under into a triangle to form the front wall $a$ as shown in Fig. 5.

The visor housings 2 are mounted on the top and exterior of the housing A (Figs. 5, 11 and 12) and may be secured thereto by any suitable means as by the rivets $a'$. The front edges of the visor housings 2 are bent downward as at $b$ to serve as stops to hold the visors in any desired position by being received in notches $c$ that are formed between adjacent ends of metal protecting clips $d$ mounted on the ends of the visor frames 30, and the ends of the visor frames 30 are curved, so that the normal tendency of the visor frames 30 is to urge the same upwardly against said stops, thereby maintaining the stop in the notches $c$.

The steel wire frame 30 of the sun visor and the metal thumb tab $w$ secured thereto is covered with any suitable fabric 31' to prevent sun glare, and three edges of the frame 30, as shown in Fig. 11, are provided with short metal clips $d$, which form the notches $c$ and prevent wear of the fabric 31' at its edges when the visor is moved out of and into its housing 2. The fabric 31' covering the front edge of the visor and thumb tab prevents scratching of the windshield when the visor is in use, or when it is moved into or out of its housing. I thereby provide a thin flat visor which may be slid in or out of the housing as desired, by merely pulling the thumb tab $w$ downward to release the latching engagement of the clips $d$ with the front edges $b$ of the housing.

In Fig. 11, sections of the visor housings 2 are cut away to disclose one complete visor 31, and the other visor 2' has the covering 31' and metal clips $d$ removed to disclose the visor spring frame 30 and metal thumb tab $w$ secured thereto, and the cut away portions also disclose the front end construction of the outer housing A.

At the front corners of the holder A the frontal sections of the visor housings are extended downward to bind together the corners of the holder and to support the front ends of the blind races (see Figs. 1, 5, 11 and 12).

At the front central portion of the holder case I have provided an upstanding metal strip 4 (see Figs. 1, 5 and 11) which is connected to the triangular front wall $a$ and to the front corners of the visor housings 2, so as to maintain the visor housings and outer housing A in rigid relationship.

The rear cross member 3 is preferably formed by bending a strip of metal upon itself as shown by dotted lines and shaded portions in Fig. 5 and lapping the upper ends thereof, and the front wall 3' is extended beyond the lapped ends, and such extended portions are bent backward to form end plates 5 and 6 (Figs. 2 and 5) which are provided with a bayonet slot 5' and bearing 6' respectively, and in which the axles of the blind roller are mounted. The tops and bottoms 3'' and 3''' of the extended portions of the front wall 3' are bent outward and curved toward each other to fit against the curved side walls of the outer housing A as shown in Fig. 2. The end plate 6 is provided with a bushing to receive the pintle 6a of the blind roller 41, and the bayonet slot 5' in end plate 5 receives the rectangular end 3a of the roller 41.

The reel case B is preferably formed of a single piece of sheet metal having a bottom portion 7, front and rear walls $e$ and $e'$, top sections 7c and 7d and side walls 7a, 7b. A separating wall 45 extends from front to rear of the bottom portion 7 and acts as a brace, as well as a dividing wall, and together with a binding strap 46 that extends transversely of the reel case B (see Fig. 10), serves to brace and maintain the bottom, end and side walls of the reel case B in rigid relationship. The front and rear edges $e, e'$ of the bottom portion 7 are bent upwardly at right angles to the bottom portion 7, and are then curved inwardly to partly cover the idler covers 47, 48, 49 and 50. The right and left ends of the bottom portion 7 are bent upwardly at right angles to form side walls 7a, 7b and are then bent inwardly, as at 7c and 7d, to form top reinforcing sections to which the binding strap 46 is secured by the bolts 150, that extend through the pivot columns 63, and to which side walls and top reinforcing sections, parts of the operating mechanism are attached. At the corners of the front and rear edges e, e', the adjacent portions of the side walls 7a and 7b are lapped over and soldered, or otherwise secured to such front and rear edges e, e' so as to form with the dividing wall 45 and brace 46 a rigid reel case B.

The reel case B is supported in the holder at the right end by inserting the right end of the case into the right end of the holder A, so that such end rests upon the blind race 35 at the right end of the holder, and then moving the left end upwardly into the holder A in which position it is supported by two brackets 8 that are secured to and suspend from the top main section 1 of the holder case A, and which brackets are provided with screws 8' that are passed through the brackets 8 and threaded into the reel case, and are provided with knurled heads for easy hand operation. The reel case B, when mounted as thus described, leaves a chamber 200 at the left hand side of the device, and in which the lamp arm 21 and other operating parts may be mounted, and also provides sufficient space to permit the insertion of a person's hand to operate the screws 8', and to also leave sufficient room for the operator to grasp one of the pendants 16—19 when the device is operated.

At the left hand side of the reel a key card 9 (Fig. 1) is attached, and on which a legend (not shown) is printed, which may give directions for operation and other desirable information. The key card 9 may be secured to the bottom portion 7 of the reel case B in any suitable manner, and as shown, tangs 9' are struck up from bottom 7 to form retaining lugs, under which the card 9 may be slipped.

The index strip 10 and the map strip 11 are printed on separate rolls, the index strip being approximately 4" wide and of any predetermined length; and the map strip being approximately 20" wide and of any predetermined length, say of approximately 20 feet, more or less.

The front end of the map strip 11 is attached to the spool 12 (Fig. 10) by means of a strap 12' and screws 12", and is wound around the spool 12 by turning the spool 12 counter-clockwise when viewed from the right end thereof. The other end of the map strip 11 is then passed over the front idler roller 49, thence through the slot f formed in the bottom 7 of the reel case, and the strip 11 is then extended over the bottom 7 and through the slot g and around the rear idler roller 50 and its free end secured by means of a strap 13' and screws 13" to the rear map spool 13, upon which the map 11 is wound by turning the spool 13 in a clockwise direction when viewed from the right end thereof. The index strip 10 is mounted upon spools 14 and 15 in a manner similar to that of mounting the map strip 11, and the index strip is extended through analogous slots f' and g' in the bottom 7 of the reel case. The index strip is controlled independently of the map strip 11 by mechanism mounted at the left end of the reel case, and the map strip 11 is controlled through mechanism mounted in the right end of the reel case.

Adjacent the slots f and g through which the map strip 11 is extended, I have provided indicia or guide letters h designating spaces i between guide lines 201, which extend longitudinally from end to end of the map strip 11. Along the longitudinal edges of the map strip 11, I have provided a plurality of spaces in which indicia such as the numerals k are printed, and such spaces j provide intersecting spaces to correspond with the lines 202 that extend transversely of the map strip, so that any one of the squares 203 formed throughout the length and breadth of the map strip may be easily indicated and quickly located by reeling the map strip in the proper direction.

If desired, and for the sake of convenience, the index strip may be separated into sections l, m, m' by any suitable method such as consecutive numerals n, and by printing the first name in the ensuing section for separating indicia in enlarged or bold face type.

A flexible transparent cover with a metal framework (not shown) may be secured by any suitable means to enclose the key card 9 and the index and map strips 10 and 11, and in such event the guide letters h may be shown on the metal framework of such cover.

The map strip 11 is moved toward the front of the device by pulling the front pendant 16 (Figs. 1 and 10) downward and releasing the same, and the map strip 11 is moved toward the rear of the device by pulling the pendant 17 downward and releasing the same. The index strip 10 is moved toward the front of the device by operation of the pendant 18, and by pulling the pendant 19 downward and releasing the same, the index strip 10 is moved toward the rear of the device, and such operation is more fully hereinafter described.

End plates 20, 20' are secured to the side walls 7a and 7b respectively by screws r. The end plates 20' are provided with bushings 77 to receive the axles 68, 68' of the front and rear index winding spools 14 and 15 respectively; and such end plates 20' are provided with studs 80, to which the outer ends of the ratchet springs 78 are anchored (Fig. 14). The inner ends of the winding spools 14, 15 are supported by pintles (not shown), and which are driven through center holes in the metal washers that are held to the spool by the metal spool end flanges 14', 15' and then driven into the wooden body of the spools and are journaled into bushings 204 in the separating wall 45. The front and rear map winding spools 12 and 13 have their outer ends journaled in the end plates 20. The end plates 20 and 20' are oppositely identical with each other, and a description and showing of one is believed to suffice for the other. The end plates 20, 20' are offset at their outer rims as at q (Figs. 5 and 14) to allow them to fit into holes p, p' formed in the end walls 7a and 7b of the reel case B; and provide means whereby the spools and associated parts may be easily and quickly inserted into and removed from their respective positions.

I have provided extendable means for illuminating the index and map strips so that the same may be visible in the night time, and such means are mounted in the chamber 200 formed in the outer housing A between one end thereof and one end of the reel case B. And such means include an elongate lamp arm 21 (Figs. 1 and 5), preferably of heavy gauge sheet metal, enlarged at one end and having a portion thereof bent at right angles thereto to form a base s and an enlarged side t that provides a guard for the lamp u. The arm 21 is hinged to a bracket 22 that is secured as by rivets 22a to the top or main section 1 of the holder A, and from which it depends.

When the lamp is not in use, it is moved into the chamber 200 and is held therein as shown in dotted lines Fig. 5 by a spring catch 23 that is hinged as at 23' to a pair of brackets 23'' secured to the arm 21 by any suitable means as the rivets 23a, and when the arm 21 is moved about its pivot 22b into the chamber 200, the lower free end of the spring catch 23 is moved outwardly by spring 23''' and rests upon the upper surface of the left blind race 35 to retain the arm 21 in chamber 200. The arm 21 is prevented from sidewise movement by means of a guide strip 25 that is secured at one end to the top section 1 and at its other end to the upper surface of the blind race 35, as by the rivets 25' (Figs. 1 and 5). A guard member 26 secured to the top of the blind race prevents the free end of the lamp arm 21 from swinging outwardly and becoming lodged on the blind race 35. When the lamp arm 21 is moved out of the housing, as shown in Fig. 5, to illuminating position, an electric circuit to the lamp u is automatically completed by means of the switch 210, which includes a spring contact terminal 27, that is insulated from and secured by the stud and fibre washer 27, to the main section 1, and is electrically connected through wire 29 with the ammeter, and in such moved or extended position of the lamp arm, contacts a stud or stationary contact 28 that is secured to and insulated from arm 21 and is electrically connected with the lamp u by means of the wire 29', thereby automatically closing the circuit to the lamp, and automatically opening the same when the lamp is moved into the housing. The metallic lamp arm 21 and body of the car is used for the return conductor of the electric circuit to the lamp u.

The conductor 29' from the insulated stud 28 passes through a hole 211 in arm 21 and then through hole 212 in arm 21 to avoid contact with the guide strip 25; and from a point adjacent the strip 25 and to the side t, the upper edge of the arm 21 is bent inwardly to form a tubular section v thereon, and through which the conductor 29' is extended to the lamp u.

The blind 32 (Figs. 1, 5 and 8) is attached at one end to the blind roller 41 and is attached at its front end to a metal cross strap 34. In Fig. 5, blind 32 is wound upon the blind roller 41 and exposes the key card 9, index and map strips 10 and 11, and also exposes the chamber 200. At the front corners of the blind 32 I provide metal protectors 33, which bind the blind fabric 32 to the ends of the cross strap 34. These protectors 33 hold the blind taut transversely of its expanse and slide in the blind races 35 to prevent wear on the blind fabric 32 when the blind is slid along the races 35. The blind races 35 are illustrated in end elevational views in Figs. 2 and 8, and in side elevation in Fig. 5. The upper portions of the ends of the races 35 adjacent the blind roller 41 are turned upwardly and around the ends of the rear cross member 3 to prevent wear on the blind where the same enters the rear ends of the blind races.

A knob 36 is secured intermediate the ends of the cross strap 34 and serves as a handle when the blind is operated, and also serves as a stop that engages the blind cover plate 40, and prevents the blind 32 from being wound up and out of an accessible position. A metal strap 37 is secured to the cross strap 34 between the knob 36 and strap 34, and is provided with an eye 37', and when the blind 32 is extended, engages a hook 38 at the forward end or front of the holder. The hook 38 is formed from a separate piece of metal and is secured to the front wall a by means of a bolt 39' that extends from the base of the rear view mirror 39, thereby providing means to securely hold the blind 32 in covering position when the machine is not in use. The spring tension of the spring 41' in the blind roller 41 normally urges the blind 32 into rolled position, thereby keeping the blind taut and neat.

The blind cover 40 fits over and covers the rear end of the holder and is held in place by screws 40', and when removed allows access to the blind 32 and its associated roller 41.

The blind roller 41 (Fig. 2) may be of any standard construction, and as shown includes a spring 41' mounted in a metal tube 41'' secured at one end of the roller, the other end x of which may be of wood or other inexpensive material, and provided with the usual pintle 6a and rectangular end 3a.

The operating pendants 16—19 (Figs. 3 and 4) each have a spherical lower end 42a and a three-sided boxing 42 at its upper end, which receives and straddles its associated pulley over which an operating cable is trained. Each pendant is provided with a central hole or bore 42', through which its associated cable is extended, and a set screw 43 extends into hole 42' and secures the cable in the pendant. The cable may be further secured to the pendant by pouring solder into the hole 42' at the lower end thereof.

The device, when assembled, may be attached to the struts (not shown) that are usually found in the top 44 of an automobile by any suitable means, such as screws (not shown) inserted through holes bored through housing A and visor housing 2 wherever necessary or desired, or, if desired, in the manufacture of an automobile provided with a metal top, the housing A may be formed as an integral part thereof or as a separate unit secured thereto.

The device is preferably positioned on the interior of an automobile top adjacent to the windshield y thereof.

In Figs. 7, 9 and 13 the separating wall 45 of the reel case B is shown in rear of the mechanism illustrated in said figures, and said wall 45 is welded or riveted at its ends to the reel case B, and is provided intermediate its ends at its top and bottom with flanges 45', 45'', by which the wall 45 may be attached to the bottom portion 7 of the reel case and to a binding strap 46 (Fig. 10). The wall 45 is provided with bushings 204 in which are journaled the inner pintles of the four winding spools 12, 13, 14 and 15, the four idler rollers 47, 48, 49 and 50, and the two storage spools 53 and 55.

Bushing plates 51 (Figs. 7, 9 and 10) are provided adjacent each corner of the reel case B to journal the outer pintles of the index and map idler rollers.

A U-shaped trough member 52 (Figs. 7 and 10) houses a metal spool 53 upon which an extra index strip may be wound and stored. A U-shaped trough member 54 (Figs. 9 and 10) houses a spool 55, upon which an extra map may be wound and stored.

The trough 54 (Fig. 9) is illustrated with a portion of its outer end cut away to illustrate the height of the inner portions of the upstanding side walls thereof, over which the map strip passes; and the inner portions of the upstanding side walls of the trough 52 (Fig. 7), over which the index strip passes, are of the same height, and such end portion of the trough 54 which extends outwardly beyond the edge of the map strip extends upwardly to the top of the reel case, and is riveted thereto in the same manner as indicated by the trough member 52 (Fig. 7); and such upstanding inner portions of troughs 52 and 54 are made low enough so that the index strip 10 and map strip 11 may freely pass over the index and map storage spools 53 and 55 and the upright side members of the troughs 52 and 54. The pintles on the inner ends of the storage spools are received in bushings 204 in wall 45, and the outer pintles of said storage spools are received in holes formed in steel spring brackets 56 that are in the form of an L, the base 56' of which is secured to the base of the troughs 52 and 54, and the upstanding portion of which may be pulled outwardly and off of its associated pintle to remove the storage spools.

A cable pulley assembly 57 (Figs. 7 and 10) includes cables 58 and 59, which operate the right end mechanism for operation of the map strip 11, and said cables 58 and 59 are extended outside of the reel case B at the left hand side thereof. This assembly 57 includes two upper pulleys 100 and 101 and two lower pulleys 102 and 103, and the shafts 104 and 104', on which said pulleys 100, 101 and pulleys 102 and 103 are respectively journaled. The pulley shafts 104 and 104' are mounted in complementary side members 105, which also serve as braces between the bottom 7 of the reel case B and the end wall 7b. A U-shaped strap member 106, having a washer 107, serves as a shim between each pair of rollers 100 and 101, 102 and 103. Said strap member 106 is secured to and extends inwardly from the end wall 7b of the reel case.

The cables 58 and 59 are respectively attached to the pendants 16 and 17, and are trained over the upper pair of pulleys 100 and 101 of the assembly 57, thence under the lower pair of pulleys 102 and 103, and through the cable guard 60 to the end 7a of the reel case, and are then trained around pulleys 108 and 109 in the pulley assembly 61 (Fig. 9), and are then connected to the ratchet pulleys 69 and 70 to operate the map strip. The cable 59 extends from pulley 108 to ratchet pulley 69 by passing through a hole 110 in the top section 7c, and then said cable 59 passes through hole 111 (Fig. 10) to ratchet pulley 69. The outer housing A at a point adjacent to where the cable 59 passes outside of the reel case through holes 110 and 111 is slightly indented (not shown) to permit free passage of the cable between the reel case and the outer housing when the reel and the housing are associated with each other.

At one end of the reel case B, I provide a pillar 62 (Figs. 9 and 10) which extends from the base 7 to the top 7c thereof, and said pillar 62 is held in place by a bolt 62' that extends through the pillar from the top to the bottom of the reel case, thereby supporting the top section 7c of the reel case against pressure that may be placed upon it by cable 59. Shifter arm pivot columns 63, mounted between the ends of spools 12 and 13, also cooperate to sustain any pressure exerted by cable 59 on the top section 7c.

Each pivot column 63 (Fig. 13) consists of a bolt 150 that passes through two pipes 150' that are held apart by a smaller pipe 150", so that when the bolt 150 which extends through the top 7c and into the bottom 7 of the reel case, is screwed home, the column forms a rigid support for the reel case, and the smaller pipe 150" provides a spacer for pipes 150', as well as an axle upon which the shifter forks 64, 65 oscillate. By this construction the ends of the shifter fork are maintained at the proper level by the shoulders formed by the difference in diameters of pipes 150' and 150" and with the pipe 150" being of a predetermined length, when the bolt 150 is screwed home the pipes 150' will not bind the shifter forks, but will be spaced apart a sufficient distance to permit free oscillation of the forks upon the smaller pipe 150". The shifter forks 64, 65 are identical and interchangeable and, therefore, a description of one will suffice for the other; each shifter fork is constructed of two pieces of strap metal riveted together and provided with a hole at its pivot end, through which the axle 150" extends, and at its free end it is bent into substantially a U shape 112, as illustrated in Fig. 13. The end 112 is fitted with a pair of rollers 113 mounted on axle 113', and said rollers 113 fit between the flanges of the sliding ratchet clutch collars 66, 67, as illustrated in Fig. 14.

Collar 66 is shown in Figs. 13, 14 and 15, and collar 67 is identical, except that the teeth 115 are reversed. The collars 66, 67 are provided with square holes 114 through their centers, allowing them to slide back and forth upon the squared section 300 of the spool shafts 68 and 68' so as to be non-rotatable therewith but slideable thereon, to engage or disengage the teeth 115 of said collar with corresponding notches or depressions 116 in the ratchet pulleys 69, 70 (Fig. 14). The other side of pulleys 69, 70 are shown in Figs. 7 and 9. The outer ends 71, 72 of the spools 14 and 15 (Figs. 13 and 14) are large metal washers with square center holes, and are shrunk onto the spool shaft a predetermined distance from the end thereof to securely hold the same in assembled position.

The spool shafts 68 and 68' are square, except for rounded sections 117 at the outer end thereof, and serve as supporting axles for the spools and as journals upon which the clutch collars 66, 67 slide, and the ratchet pulleys 69, 70 rotate. The shaft extends into the wooden section of each associated spool a sufficient distance to give required strength to the spool, and the ends of the spools are secured to the wood by a flanged ring 73, which is crimped at one end onto the spool end and into the wooden section of the spool and, at its other end, is crimped around the large metal washers 71, 72.

The spool 14, when driven by its mechanism, turns in a clockwise direction, and the spool 15, when driven by its mechanism, turns in a counter-clockwise direction. Each flange 71, 72 is provided on its outer face with notches 118, as shown in Fig. 13, and into which notches the ends of the arms 119, 120 of the ratchet shafts 74, 75 are held by springs 76, thereby preventing reverse motions when the ends of the arms 119 or 120 are in engagement with their associated notches 118.

The ratchet pulleys 69, 70 are held in position on their respective shafts by bushings 77 mounted on the outside or the free end of the shafts 68, 68' and in the cover plates 20'. The ends of the squared sections of said shafts prevent inward movement on the shafts of the ratchet pulleys 69, 70.

Inside the ratchet pulley 69 and near the wall of the reel case, a spring 78 is fitted (Figs. 7, 9 and 14), and said spring 78 tends to turn its associated pulley in a counter-clockwise direction.

In Fig. 7 the pulley 69 is mounted adjacent the left-hand end wall of the reel case B, and is associated with the index strip rollers, and is operated by the cable 82; whereas, in Fig. 9 the ratchet pulley 69 is located adjacent the right-hand end wall of the reel case B, and is associated with the map strip rollers, and is operated by the cable 59. The ratchet pulleys 69 and 70, both for the index strip and the map strip, are identical, except that the notches 116 are oppositely designed, and that the spring 78 tends to turn its associated ratchet pulley 69 in a counter-clockwise direction; whereas, the spring 78 associated with the ratchet pulley 70 tends to turn its associated pulley in a clockwise direction.

Upon pulling the cable 59 or 82, or the cable 58 or 83, the spring 78 allows its associated pulley to rotate 4 or 5 revolutions against the tension of its associated spring 78, and upon release of its associated cable the spring 78 returns its associated pulley back to the original position. The springs 78 are preferably flat steel strap springs and are anchored at one end to the studs 80 that extend from the cover plates 20 and 20' and are connected at their other ends to the studs 79 that extend from the pulleys, and such springs encircle the hubs of their respective ratchet pulleys. In assembling the device, a predetermined tension may be placed upon the springs by rotating the end plate in the desired direction, and then securing such end plate at the end wall of the reel case by the screws r.

The cables 82, 83 are passed through holes in the inner flanges 121 of the channelled periphery of the ratchet pulleys 69 and 70, and are anchored to such pulleys by clamps 81 secured to the inner faces of the flanges 121. The cable 82 is wound around the ratchet pulley 69 in a clockwise direction and is passed underneath roller 84 and over pulley 86, from which it extends through the end wall of the reel case and is secured to the pendant 18. The cable 83 is wound around the ratchet pulley 70 in a counter-clockwise direction, and is passed underneath roller 85 and over pulley 87, from which it extends through the end wall of the reel case and is secured to the pendant 19.

The rollers 84 and 85 are provided with journals at one end, which are mounted in the end wall 7b of the reel case, and are also provided with journals at their opposite ends, and are mounted in the bracket 88 secured by rivets 301 to the bottom of the reel case, and said bracket 88 is provided with two members that extend over the rollers 84, 85 and are attached to the end wall of the reel case, thereby providing a rigid mounting for the bracket 88.

The rollers 84, 85 allow the cables 82, 83 to freely travel thereunder and longitudinally therealong to aid in winding and unwinding such cables upon their associated ratchet pulleys 69, 70 without overlapping of the cable on the pulley.

A shifting lever 89 is suspended from the top section of the reel case (Figs. 9, 14, 16 and 17) by any suitable pivot means 302. The lever 89 is provided with an offset lower extremity 90, which rests against the lower sections of the pivot columns 63, and is also provided with an extension 91 at its extremity that acts as a cam against the curved ends of the ratchet shafts 74, 75 and when in engagement with one of said shafts, raises the opposite end thereof off from its associated spool and against the tension of its associated spring 76; and permits the other ratchet shaft to enter the notches 118 in the other spool by action of its associated spring 76. The lever 89 is also provided with a triangular section 92, which has a narrow extension 93 bent at right angles thereto, and the outer edges thereof are bent upwardly to form an arcuate projection, as shown in Fig. 9, and has a hole 122 punched therethrough, and through which one end of a shaft 123 extends. The other end of shaft 123 is provided with a ball that rests in a socket 124 mounted on the bottom of the reel case B, thereby permitting the shaft to rock backward and forward upon oscillation of the shifting lever 89. A flange 125 is secured to shaft 123 adjacent the ball end thereof, and forms a seat for one end of a compression spring 126 that operates between said seat and the extension 93 and holds the lever 89 in operated position at either side of its pivot, and into which position it may be thrown as in the nature of a toggle connection (Fig. 9) by operation of the lever 89.

The operation of the lever 89 by pulling on any pendant (and operation thereof by cable 83 is described) is as follows: when cable 83 is pulled by pendant 19, the ratchet pulley 70 is rotated in a counter-clockwise direction, causing a striker 96 extending from the inner face of flange 121 to engage a corner of the triangular section 92 of lever 89 and move the lever to the position illustrated in Figs. 9 and 14. The lever 89 at a point 90' (Fig. 17) engages the pointed shoulder 127 of the left shifter fork 64, causing said fork to slide the ratchet clutch collar 66 forward or inwardly to disengage the teeth 115 from its associated recesses 116 in its associated pulley 69. The section 128 of the shifter fork that extends over the shifter fork roller 113 now acts as a brake against ratchet collar 66 by virtue of its engagement therewith, thereby preventing undue spinning and unwinding of spool 14. At the same time, section 91 of the shifting lever 89 releases the ratchet shaft 75 and engages ratchet shaft 74, allowing the spring 76 to move the outer arm 120 of shaft 75 to permit the same to be urged into the notches 118 in spool end 72, thereby preventing backward (i. e., clockwise) movement of spool 15, and such movement also raises the outer arm 119 of shaft 74 away from spool end 71 and allows spool 14 to turn in a backward (i. e., counter-clockwise) direction, thereby permitting an index strip wound thereon to unwind.

At the same time contact point 90" of lever 89 releases its engagement with the shoulder 127' of the right shifter fork 65 and permits the spring 97 to slide ratchet collar 67 outwardly so that its teeth 115 engage the notches 116 in ratchet pulley 70; as ratchet pulley 70 is now rotated back and forth by alternately pulling and releasing cable 83 it will ratchet with clutch collar 67, turning it counter-clockwise; and arm 120 will oscillate in and out of notches 118 of flange 72, permitting spool 15 to turn counter-clockwise only, and the index strip will be wound onto spool 15 and unwound from spool 14. Operation of the cable 82 will reverse the operation just described, causing the index strip to be wound onto spool 14 and unwound from spool 15.

The mechanism shown in Fig. 14 for the index strip mechanism is duplicated at the right end of the reel case for operation of the map strip, except that rollers 84 and 85 and pulleys 86 and 87 and their associated brackets are omitted, and the operating cables are attached to their associated ratchet pulleys as previously described and as illustrated in Fig. 9. It will be therefore be seen that either the index or map strip may be moved in either direction by merely pulling and releasing the proper pendant.

As the device will accommodate map and index strips of considerable length, a driver is enabled to have before him for ready reference both city and rural maps covering large sections of territory, and any desired location on a map may be easily and quickly located by the driver without interfering with operation of the automobile, and without seriously detracting his attention from road hazards.

I claim:

1. In an indicating device, a reel case; a pair of rollers mounted in said case; an indicia carrying strip connected to be unwound from and wound upon said rollers, ratchet mechanisms connected to one end of said rollers; cables connected to operate said mechanisms and having depending operating pendants; and clutch means associated with said ratchet mechanisms to engage and operate one of said ratchet mechanisms in one direction when its associated pendant is operated and to automatically prevent operation of the other ratchet mechanism in reverse direction.

2. In an indicating device, a reel case; a pair of rollers mounted in said case; an indicia carrying strip connected to be unwound from and wound upon said rollers; an operating mechanism for said rollers comprising a pulley for each roller; a cable for each pulley connected to operate its pulley in one direction; a spring for each pulley connected to operate its pulley in a reverse direction; clutch means operating between a pulley and its associated roller; and means to automatically engage one clutch means upon operation of its associated cable and to disengage the other clutch means.

3. In an indicating device, a reel case; a pair of rollers mounted in said case; an indicia carrying strip connected to be unwound from and wound upon said rollers; an operating mechanism for said rollers comprising a pulley for each roller; a cable for each pulley connected to operate its pulley in one direction; a spring for each pulley connected to operate its pulley in a reverse direction; clutch means operating between a pulley and its associated roller; means to automatically engage one clutch means upon operation of its associated cable and to disengage the other clutch means; and means associated with said rollers and clutch means to permit operation of said rollers only in the desired direction.

4. In an indicating device, a reel case; a pair of rollers mounted in said case; an indicia carrying strip connected to be unwound from and wound upon said rollers; a shaft extending from each roller; a pulley journaled on each shaft; a cable connected to operate said pulley in one direction; a spring connected to operate said pulley in a reverse direction; a clutch slidably but nonrotatably mounted on each of said shaft means to move one of said clutches into engagement with said pulley and to disengage the other of said clutches from its associated pulley; means to prevent reverse movement of said rollers, said means to prevent reverse movement of said rollers being operated by the shifting of said clutches; and means to simultaneously operate said means to prevent reverse movement of said rollers and to operate said clutches.

5. In an indicating device, a reel case; a pair of rollers mounted in said case; an indicia carrying strip connected to be unwound from and wound upon said rollers; a shaft extending from each roller; a pulley rotatably mounted on each shaft; cable means to operate said pulley in one direction; spring means to operate said pulley in a reverse direction; a clutch slidably but nonrotatably mounted on each of said shafts between said pulley and said roller to engage and disengage said clutch from said pulley; means to limit rotation of said rollers in selected predetermined directions; and means for automatically engaging one clutch with its associated pulley and disengaging the other clutch upon operation of a cable.

6. In an indicating device, a reel case; a pair of rollers mounted in said case; an indicia carrying strip connected to be unwound from and wound upon said rollers; a shaft extending from each roller; a pulley rotatably mounted on each shaft; cable means to operate said pulley in one direction; spring means to operate said pulley in a reverse direction; a clutch slidably but nonrotatably mounted on each of said shafts between said pulley and said roller; to engage and disengage said clutch from said pulley; means to limit rotation of said rollers in selected predetermined directions; means for automatically engaging one clutch with its associated pulley and disengaging the other clutch upon operation of a cable; and means to maintain said clutches in predetermined operative positions when one pulley is successively operated by its associated cable.

7. In a road map reeling and displaying device, comprising in combination with an automobile having a top and a windshield; a reel case adapted to fit into and occupy an interior space just above and behind the windshield of said automobile; a pair of rollers mounted in said case; an indicia carrying strip connected to be unwound from and wound upon said rollers, ratchet mechanisms connected to one end of said rollers; cables connected to operate said mechanisms and having depending operating pendants; and clutch means associated with said ratchet mechanisms to engage and operate one of said ratchet mechanisms in one direction when its associated pendant is operated and to automatically prevent operation of the other ratchet mechanism in reverse direction.

8. In a road map reeling and displaying device, a housing; a reel case mounted in said housing and providing a chamber at one end of said housing; a road map strip in one end of said case; mechanism at one end of said case to move said road map in predetermined directions, including flexible cables; and said cables being extended into said chamber at one end of said housing and opposite the end of said case in which said mechanism is mounted.

WILLIAM E. CONWAY.